Dec. 18, 1962 R. F. NAUL ETAL 3,068,884
APPARATUS FOR OPERATING AN UNDERGROUND STORAGE
RESERVOIR FOR LIQUEFIED PETROLEUM GAS
Filed July 24, 1958 2 Sheets-Sheet 2
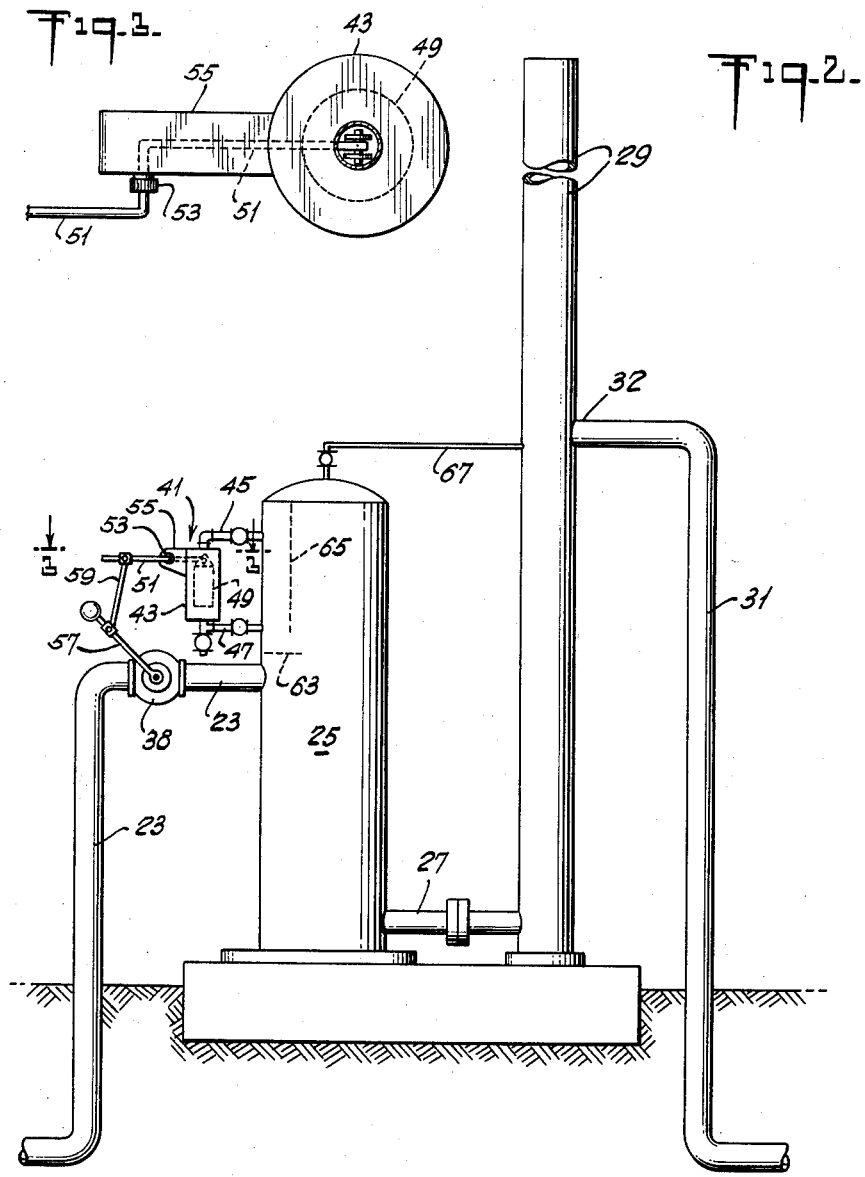

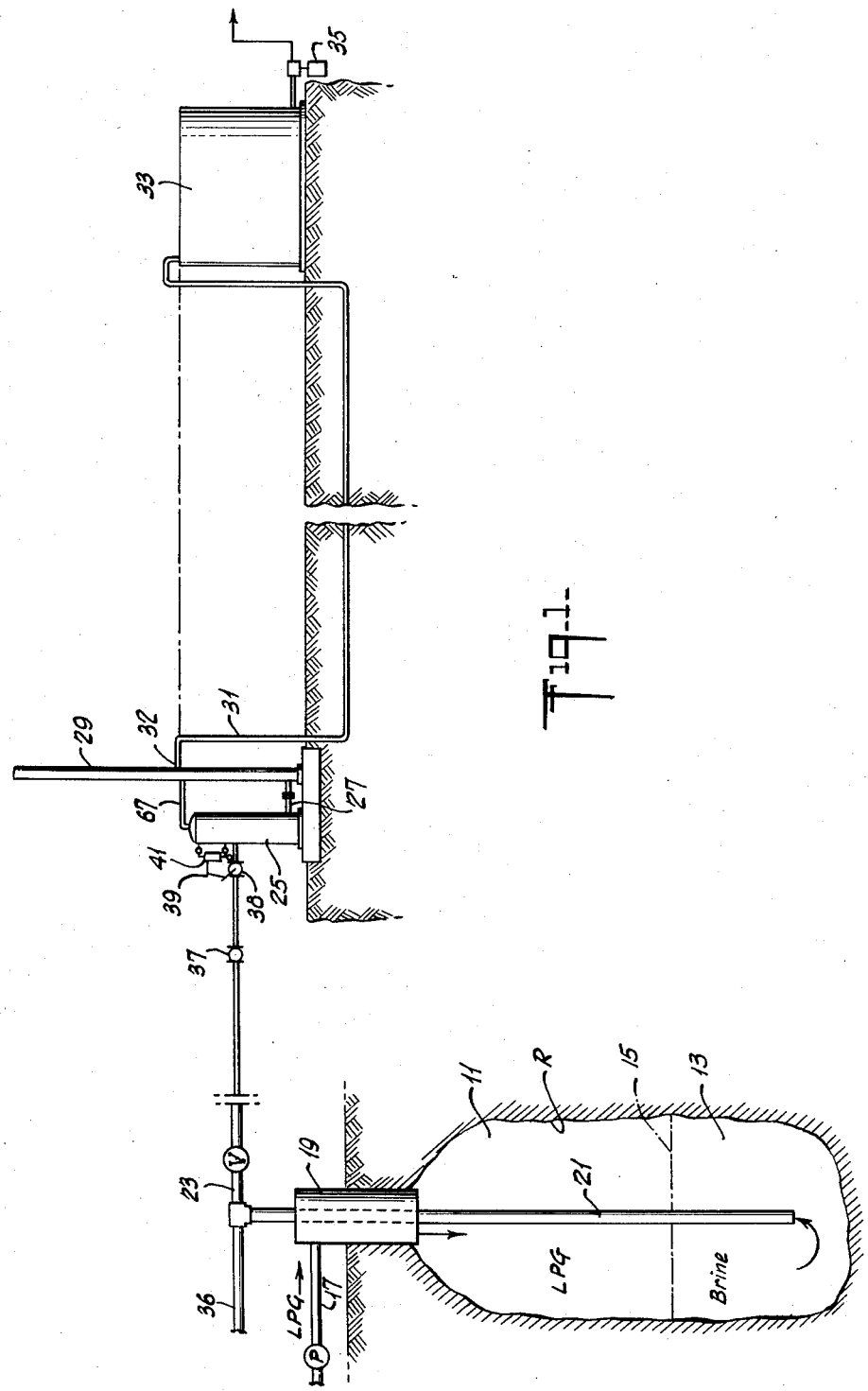

United States Patent Office 3,068,884
Patented Dec. 18, 1962

3,068,884
APPARATUS FOR OPERATING AN UNDERGROUND STORAGE RESERVOIR FOR LIQUEFIED PETROLEUM GAS
Robert F. Naul and John W. De Fore, Fort Worth, Tex., assignors to Texaco Inc., a corporation of Delaware
Filed July 24, 1958, Ser. No. 750,765
5 Claims. (Cl. 137—172)

The present invention relates to a novel method of and apparatus for operating a storage reservoir, such as an underground cavern in a body of salt deep below the surface of the earth. More particularly, the invention concerns automatic regulation of a flowing stream of a control fluid, such as brine, as it is expelled from a reservoir through a discharge line by an incoming immiscible fluid, such as liquefied petroleum gas (L.P.G.), so that if an appreciable quantity of immiscible fluid should appear with the control fluid in the discharge line the discharge line is immediately automatically shut off.

For several years L.P.G. and other light liquid chemicals, such as gasoline, have been stored in tremendous underground storage caverns in salt formations hundreds of feet below the surface of the earth, using a pool of aqueous brine solution below the lighter liquid chemical as a control medium. Operation of such a cavern is ordinarily conducted by injecting L.P.G. into the cavern under pressure through a first pipe opening into the top of the cavern, and simultaneously expelling brine from the cavern by displacement through a second or brine pipe which terminates near the bottom of the cavern and extends concentrically up through the first pipe. If a leak were to develop in the second pipe above the interface between the L.P.G. and brine, the stream of brine leaving the cavern would carry with it considerable L.P.G. Moreover, if the L.P.G.-brine interface in the cavern were to fall below the entrance to the second pipe, then L.P.G. would leave in a stream through the second pipe.

Brine leaving a cavern ordinarily is passed to an open brine filter tank and thence to a storage reservoir. Any L.P.G. accompanying the brine will separate therefrom in the filter tank and be wasted. This is particularly undesirable when the filter tank is located in an industrial area such as an oil refinery wherein the L.P.G. may be ignited.

An additional problem is that sometimes two or more storage caverns are operated in the same vicinity, using the same brine for controlling both cavities. For example, brine expelled from a cavity being filled with butane may be passed directly into a second cavity for expelling stored propane therefrom. Any butane accompanying brine leaving the first cavity would contaminate the propane in the second cavity.

In the following description, the control system will be described as applied to brine as the control fluid and L.P.G. as the immiscible stored fluid. However, it is to be understood that the principles apply to other fluids fulfilling the same functions.

In accordance with the present invention the above mentioned problems are solved by providing novel apparatus for transferring an aqueous brine solution from a storage reservoir for L.P.G. to a disposal zone comprising a first conduit adapted to conduct brine from the reservoir, a control vessel connected to the first conduit for receiving brine therefrom, a second conduit leading from the vessel for conducting brine therefrom, a valve controlling one of the two conduits, and a condition responsive device such as a float operably associated with the vessel on the inside or the outside thereof, and exposed to the fluid therein. The latter device assumes a first position when the vessel contains brine, and moves to a second position when the vessel contains L.P.G. The apparatus also includes mechanism connecting the condition responsive device to the valve, and operable to hold the valve open when the device is in its first position and to close the valve automatically when the device moves to its second position.

The invention will be described more in detail hereinafter with reference to the accompanying drawings wherein:

FIG. 1 is a schematic side elevational view, parts being shown in vertical section, of a storage system which includes the novel apparatus of the invention;

FIG. 2 is an enlarged side elevational view of a part of the apparatus shown in FIG. 1; and FIG. 3 is an enlarged plan view of a part of the apparatus of FIG. 2 as viewed from the line 3—3.

Referring now to FIG. 1, there is shown a 100,000 barrel capacity storage reservoir R containing a body 11 of L.P.G. floating upon a pool 13 of brine, the interface being at the position 15. As more L.P.G. is pumped through a supply conduit 17 and a casing 19 down into the cavern, brine is forced up through a pipe 21 to a first conduit 23. Brine passes from conduit 23 into a vessel 25 of relatively large volume, and thence passes out through a second conduit 27 and into a standpipe or stack 29 near the bottom thereof. A vessel 25 having a diameter of 24 inches and a height of 6 feet has been used successfully.

From standpipe 29 brine then leaves through a third conduit 31 connected into the standpipe at a level 32 substantially higher than the point of entry of conduit 27 therein, and enters a filter tank 33 whose top surface is approximately on a level with 32. From tank 33 the brine is passed by a pump 35 to a storage reservoir, or to another cavern as a control liquid therefor. Brine may later be pumped back into the cavern R through a conduit 36 when L.P.G. is to be forced out.

The first conduit 23 contains both an excess flow valve 37 which is designed to shut off the flow of liquid when its flow rate exceeds a predetermined value, and a shut off valve 38 upstream of vessel 25 which may be a plug valve requiring a relatively slight rotary motion between fully open and fully closed positions.

Valve 38 is controlled automatically by a linkage mechanism 39 connected to a condition responsive device 41 which is coupled into the vessel 25 for response to a characteristic condition of the liquid therein.

With the apparatus described above, if a leak were to develop in the pipe 21 above the level 15, a quantity of L.P.G. would accompany the brine being expelled from the cavern and would enter into the vessel 25 with the brine. The fact that the conduit 23 enters into the vessel 25 a substantial distance above the second conduit 27 will prevent the L.P.G. from passing out through the conduit 27 as long as there is still brine in the vessel, because the L.P.G. is lighter than the brine and rises to the top. When a quantity of L.P.G. has accumulated in the top portion of vessel 25 the mechanism 41 is actuated and automatically closes the valve 38 through the linkage 39 to shut off the flow of mixed brine and L.P.G. completely.

Referring now to FIGS. 2 and 3, control mechanism 41 comprises a chamber 43 which is connected into the vessel 25 by means of upper and lower ducts 45 and 47 so that the liquid in the chamber 43 is always the same as the liquid in the top portion of vessel 25 above duct 47. A hollow float 49 in the chamber 43 is suspended on the end of a lever arm 51 which extends from the inside to the outside of the chamber and is pivotally mounted between its ends in a conventional stuffing box 53 on the side wall of a housing 55 near the top of chamber 43. Float 49 has an apparent specific gravity less than the brine, but greater than the L.P.G. so that it assumes an upper position in brine but moves to a lower position in L.P.G.

Lever arm 51 is connected to a valve actuating lever 57 by a link 59 so that when the float 49 is floating in the liquid of chamber 43 in an upper position, the valve 38 is held open. However, when a substantial quantity of L.P.G. has accumulated in the top portion of vessel 25 so that the interface between the brine and L.P.G. is below the level of duct 47, then the chamber 43 is filled with L.P.G., the float 49 sinks in the liquid to a lower position, and lever arm 51 then tilts on its pivot 53 and acts through link 59 and lever 57 to close valve 38.

Horizontal and vertical baffles 63 and 65 are secured to the walls of vessel 25 near to the points of entry of ducts 45 and 47 to prevent surging of liquid within the vessel 25 from disturbing the interior of said chamber and affecting the float 49.

During normal operation a small quantity of air or other gas may be carried along with the brine leaving cavern R without producing any detrimental effects. The vessel 25 is provided with a bleeder tube 67 of small cross section which opens from the top of vessel 25 and extends over to the stack 29 so that any gas which accumulates in the top of vessel 25 is dissipated to the atmosphere from the top of the stack. The bleeder 67 is too small to carry off the large quantities of L.P.G. resulting from a leak. The height of this stack should be high enough to provide a static head of brine sufficient to force brine to tank 33, as well as to dissipate any gas above a level where there is any danger of fire or explosion as a result of other operation proceeding in the vicinity. A stack having an 8 inch diameter and a height of 37 feet has been used successfully, with the point 32 8 feet above the ground level. The stack is especially necessary as a safety device in case the valve controlling apparatus should fail to function. On the other hand, no stack is necessary if operations are not conducted in an area where hazards of fire or explosion exist.

The height of the conduit 31 where it leaves stack 29, and the height of tank 33 are made about equal so that if the flow of fluids through conduit 23 should be arrested, there will be no back flow of brine from tank 33 through the system.

It is evident that there has also been provided an important improvement in the method of operating a storage reservoir by displacing therefrom a first fluid, such as an aqueous brine solution, while introducing therein a second immiscible fluid, such as a non-aqueous liquid chemical, of lower specific gravity than the first fluid, and conducting the displaced first fluid in a stream to a disposal zone. This improvement involves passing the stream from the cavern R through a separating zone of large volume in the vessel 25 to produce phase separation of any immiscible fluids therein by gravity, and controlling flow of the stream of fluid in conduit 23 automatically in response to a condition characteristic of the fluid in a section of the vessel 25 normally occupied by the first fluid, but in which second fluid accumulates when accompanying the first fluid. Such controlling is accomplished by permitting free flow of the stream in response to a condition of the fluid in such a section which is characteristic of the first fluid, and by stopping the flow of the stream when the condition changes and becomes characteristic of the second fluid.

The invention has been described specifically as applied to the storage of light L.P.G. on a heavier brine. It is evident, however, that the principles are also applicable to other immiscible liquids and to other control liquids, and that the control liquid may be heavier or lighter than the stored liquid as long as the effect of the position of the float 49 is to open and close the valve 38 under the desired conditions of operation.

Obviously, many modifications and variations of the invention, as hereinbefore set forth, may be made without departing from the spirit and scope thereof, and therefore, only such limitations should be imposed as are indicated in the appended claims.

We claim:

1. Liquefied petroleum gas storage apparatus comprising, in combination, an underground storage cavern containing a lower pool of brine and an upper pool of liquefied petroleum gas floating on said brine; a first conduit having an entrance near the bottom of said cavern and within said pool of brine, and leading up through said upper pool to the surface of the earth for conducting brine out of said cavern when liquefied petroleum gas is introduced therein on top of said brine; a vessel connected to said first conduit for receiving brine therefrom; a second conduit leading from said vessel having an entrance in position for receiving and conducting brine therefrom; a valve controlling said first conduit; a float operatively associated with said vessel and exposed to the fluid therein, the construction and arrangement being such that said float floats on brine but when liquefied petroleum gas leaks into said first conduit in said cavern and flows with said brine the level of the brine in said vessel falls and said float drops to a lower level; and mechanism connecting said float to said valve and operable to hold said valve open when said float is floating on brine, and to close said valve when liquefied petroleum gas enters said vessel and said float drops to a lower level; and a restricted bleeder from the top of said vessel connecting the inside of said vessel to the atmosphere, and sized to release to the atmosphere gas normally accumulating in the top of said vessel, said bleeder being insufficient in cross-section to carry off the larger quantities of petroleum gas resulting from such an aforesaid leak whereby lowering of said float and closing of said valve occurs in response to accumulation of leaked petroleum gas in said vessel.

2. Liquefied petroleum gas storage apparatus comprising, in combination, an underground storage cavern containing a lower pool of brine and an upper pool of liquefied petroleum gas floating on said brine;

a first conduit having an entrance near the bottom of said cavern and within said pool of brine, and leading up through said upper pool to the surface of the earth for conducting brine out of said cavern when liquefied petroleum gas is introduced therein on top of said brine and the level of said pool of brine is progressively lowered;

a vessel connected to said first conduit for receiving brine therefrom, but said vessel being free of communication with said upper pool;

a second conduit leading from said vessel having an entrance in position for receiving and conducting brine therefrom;

a valve controlling said first conduit;

a float operatively associated with said vessel and exposed to the fluid therein, said float being located above said entrance of said second conduit, the construction and arrangement being such that said float floats on brine but when liquefied petroleum gas leaks into said first conduit in said cavern and flows with said brine the level of the brine in said vessel falls and said float drops to a lower level;

mechanism connecting said float to said valve and operable to hold said valve open when said float is floating on brine; and to close said valve when petroleum gas enters said vessel and said float drops to a lower level;

a stack having a top at a high level;

and a restricted outlet from the top of said vessel connected to said stack below said top for releasing gas to said stack.

3. Apparatus in accordance with claim 2, wherein said second conduit is connected to said stack at a first locality, and wherein a third conduit leads from said stack at a second locality above said first locality for conducting fluid therefrom.

4. Apparatus in accordance with claim 3, also comprising a receiving tank for first fluid connected to said third conduit, the top of said tank being approximately on a level with said second locality to prevent back flow of first fluid to said vessel when said valve is closed.

5. Apparatus in accordance with claim 2, wherein said first conduit is connected into said vessel a substantial distance above the bottom thereof, and wherein said second conduit is connected into said vessel a substantial distance below said first conduit to permit separation of first and second liquids gravitationally.

References Cited in the file of this patent

UNITED STATES PATENTS

| | | |
|---|---|---|
| 473,056 | Bosworth | Apr. 19, 1892 |
| 1,582,855 | Peter | Apr. 27, 1926 |
| 2,169,561 | Layne | Aug. 15, 1939 |
| 2,213,857 | Griffith | Sept. 3, 1940 |
| 2,258,450 | Graham | Oct. 7, 1941 |
| 2,452,615 | Thomson | Nov. 2, 1948 |
| 2,756,028 | Byerley | July 24, 1956 |
| 2,901,403 | Adams | Aug. 25, 1959 |
| 2,938,383 | Blackburn | May 31, 1960 |